United States Patent [19]
Lamba et al.

[11] Patent Number: 5,919,295
[45] Date of Patent: Jul. 6, 1999

[54] LOCOMOTIVE ADHESION ENHANCING MATERIAL MIXTURES

[75] Inventors: Harinder Singh Lamba, Downers Grove; Robert Thomas Scott, Lockport, both of Ill.; Joseph Kalousek, Vancouver; Keping Hou, Richmond, both of Canada

[73] Assignees: General Motors Corporation, Detroit, Mich.; National Research Council of Canada, Ottawa, Canada

[21] Appl. No.: 08/794,160

[22] Filed: Feb. 3, 1997

[51] Int. Cl.$^6$ ........................................................ C09K 3/14
[52] U.S. Cl. ...................................... 106/36; 291/1; 291/2
[58] Field of Search ................................ 106/36; 423/446, 423/593, 596, 595, 598, 600; 501/128, 105; 291/2, 1; 51/309

[56] References Cited

U.S. PATENT DOCUMENTS

| | | | |
|---|---|---|---|
| 1,528,638 | 3/1925 | Tone | 106/36 |
| 2,787,965 | 4/1957 | Luvisi | 106/36 |
| 2,824,526 | 2/1958 | Nohejl | 106/36 |
| 3,663,497 | 5/1972 | Ninomiya et al. | 106/36 |
| 3,850,691 | 11/1974 | Bleil et al. | 134/4 |
| 4,310,191 | 1/1982 | Halldin | 295/31 R |
| 4,431,227 | 2/1984 | Howell | 295/33 |

OTHER PUBLICATIONS

Andrews, "Chemical Methods of Improving Rail Adhesion", *Proc Instn Mech Engrs 1963–4*, vol. 178, Pt 3E, pp. 172–184 (No Month).

Astle–Fletcher, "Mechanical Methods of Improving Rail Adhesion", *Proc Instn Mech Engrs 1963–4*, vol. 178, Pt 3E, pp. 185–205 (No Month).

Barwell, "Wheel to Rail Adhesion", Contact Mechanics and Wear of Rail/Wheel Systems International Symposium, University of British Columbia, Vancouver, Jul. 6–9, 1982, pp. 503–521.

Ohno et al, "Development a New Method for Adhesion Improvement Replacing Traditional Sanding", International Heavy Haul Association 1994 Mini–Conference, Omaha, Nebraska, Jun. 5–10, 1994, Pre–Conference Proceedings, pp. 1–6.

*Primary Examiner*—Michael Marcheschi
*Attorney, Agent, or Firm*—George A. Grove

[57] ABSTRACT

The adhesion between a locomotive drive wheel and supporting rail can be substantially increased by application of a powder mixture that contains a hard particle constituent preferably including alumina, a soft particle constituent preferably including titania, and an iron oxide constituent. The mixture may be in the form of a dry powder, a paste with water or alcohol vehicle, or a metal composite that includes the powder.

7 Claims, No Drawings

LOCOMOTIVE ADHESION ENHANCING MATERIAL MIXTURES

TECHNICAL FIELD

This invention relates to adhesion (friction) enhancing material mixtures for use between the drive wheels of a locomotive and the supporting rail. More specifically, this invention relates to particulate mixtures which may be used in the form of dry powder or paste or in a metal matrix for the above-stated purpose.

BACKGROUND OF THE INVENTION

It has long been the experience of railroad engineers that there are situations in which it is desirable or necessary to increase the friction between the drive wheels of the locomotive and the supporting rails. Situations may arise in train starting situations or in incline braking situations or the like in which an increase in the adhesion between the drive wheels of the locomotive and the rails would enable the train to better manage the operating situation.

The tractive effort of a locomotive is the pull force it is capable of generating in order to move a train of railroad cars. The tractive adhesion of the locomotive is the tractive effort divided by the weight of the locomotive expressed as a percentage. The braking effort of a locomotive is the retarding force it is capable of generating in order to decelerate a train. The braking adhesion of a locomotive is the braking effort divided by the weight of the locomotive expressed as a percentage. The level of adhesion delivered by a locomotive is ultimately limited by the capacity of the system hardware. However, since adhesion is dependent on the frictional conditions between the steel wheel of the locomotive and the steel rail, contaminants, lubricants and other operating conditions can lower the adhesion available. A higher adhesion value is of great technical and commercial significance since it means that the locomotive can pull more freight cars or passenger cars having the same rolling resistance per vehicle.

The conventional strategy that has been pursued for many decades is to dispense sand particles ahead of some of the wheels of the locomotives which, together with wheel slip, increase the friction levels by cleaning the surfaces or by diluting the contaminants. Typical contaminants include grease, oil, water, leaves or the like that are on the rail or dropped by the train. They reduce the traction by reducing the adhesion between the drive wheels and the rails. The sand is used in the form of a powder of suitable particle size range. The sand is stored in sand boxes of locomotives and, when needed, allowed to flow by gravity feed and then blown through a hose under air pressure, out through flat nozzles and into the wheel-rail contact. The sand specification typically in use requires a minimal silica content of 90% so that the rest of the material (which, for commercially available sand, is usually clay) is not expected to be enough to significantly reduce the friction capacity of the sand.

The principal advantages of sand use are its low cost and the fact that it provides reasonable increases in adhesion under contaminated conditions. The principal disadvantages of sand are that large quantities are needed, which means significant weight added to locomotives, the damage caused to vehicles and track by sand's abrasive characteristic, and the big and somewhat expensive capital equipment facilities that are needed at railroad yards to store and dispense the sand. Further, sand simply does not provide optimal adhesion levels that are required in the railroad industry.

Apart from sand, other oxides such as alpha alumina and mullite, a mineral consisting of $3Al_2O_3.2SiO_2$, have also been described in the literature if not used in actual practice. See "Development of a New Method for Adhesion Improvement Replacing Traditional Sanding," K. Ohno et al, Railway Technical Research Institute, Tokyo, Japan, presented at the 1994 Miniconference of the International Heavy Haul Association, Omaha, Nebraska, Jun. 5–10, 1994. Also, U.S. Pat. No. 4,431,227 to Howell discloses a railroad wheel having cermet surface pads which are described as being capable of increasing friction between the wheel and a rail. Among the cermets which are described are oxides of aluminum and silicon, carbides of silicon and titanium, and borides of nitrogen and carbon. Industrial diamonds are also described as being useful. Similarly, U.S. Pat. No. 4,310,191 to Halldin describes railroad wheels having a peripheral wear layer made of steel or the like which had embedded in the surface carbides, oxides, borides or nitrides for increasing the frictional characteristics of the wheel. In the case of these latter two patents, the friction-enhancing material is embedded in the wheel and wears off and may not be available or suitable for specific situations which require temporary high traction or adhesion for acceleration or stopping.

It will be apparent that the prior art does not include dry powder mixtures, paste mixtures and rubbed on solid metal matrix composites, formulated to maximizing adhesion in traction and braking.

SUMMARY OF THE INVENTION

This invention utilizes a particulate mixture of two or three different types of constituents. The composition, hardness and particle size of the respective constituent particles is such that they cooperate to promote adhesion between a locomotive wheel and its supporting surface, thus permitting a given locomotive to exert a greater pull force or braking force on the cars of the train.

In one preferred embodiment of the invention, a suitably prepared and comminuted member of the bauxite group of minerals is employed. In its useful form, the typically dried, calcined and comminuted bauxite material includes alumina ($Al_2O_3$) as the principal constituent with small amounts of titania ($Ti_2O_3$), iron oxide ($Fe_2O_3$), and silica ($SiO_2$) particles. The alumina typically constitutes 85% by weight or more of the mixture. The particle sizes of the traction increasing material is in the range of 30 to 100 standard mesh size or about 150 to 600 micrometers.

In this embodiment of the invention, predominantly aluminum oxide-containing compositions with relatively small amounts of titanium dioxide and iron oxides with permissibly some silica are available from bauxite mineral precursors. Of course, bauxite is a mineral that is located in many parts of the world and is known to be rich in aluminum oxide content with small amounts of other metal oxides such as titanium oxide, iron oxides and silicon oxide among others. Some of these minerals are not particularly preferred for aluminum metal production and are cleaned, calcined or otherwise processed to provide a source of aluminum oxide-containing material that may be known variously as brown alumina or calcined bauxite. It has been found that in the practice of the subject invention, such materials, especially those containing more than about 80% alumina with a few percent each of titanium oxide and iron oxide, are suitable for locomotive-to-rail adhesion-enhancing purposes. In the use of the materials, there are particles of the combined oxide, not particles of the individual oxide. Suitably, such particles in the range of 30 to 100 mesh may be used in the practice of this invention. Alternatively, particles of the same composition having different mesh size ranges such as, for example, one group of particles of mesh size 30 to 100 and another group that would be substantially finer in mesh size could be used for forming adherent traction layers between a locomotive wheel and the underlying rails.

In a somewhat broader embodiment of the invention, the mixture may be formed of a suitable synthetic mixture of the above-identified oxides having specific particle sizes. Mixtures, in weight percentage, of alumina 40% to 96%, titania and/or iron oxide 4% to 60%, and optionally silica 0% to 20% have been effective where the mesh size of the alumina is suitably in the range of 30 to 100 mesh, 150 to 600 $\mu$m, the mesh size of the titania and/or iron oxide particles are in the range of 200 to 325 mesh, 45 to 75 $\mu$m, and the mesh size of the silica (if present) is 100 to 200 mesh, 75 to 150 $\mu$m.

The above two or three constituent type-containing particle mixtures provide a significant improvement in the coefficient of friction, adhesion or traction between a driven locomotive wheel and the underlying rail because of the respective hardness values and their capacity to intermingle so as to provide an adherent traction layer between the wheel and the rail.

The alumina constituent has a high hardness value, i.e., a value of 9 on the Mohs scale. The titania has a hardness value of only 6 on the Mohs scale and serves to flatten and form complementary particle shapes between the harder alumina particles. The iron oxide particles, whether hematite ($Fe_2O_3$) or magnetite ($Fe_3O_4$) have hardness values of about 6 to 6.5 on the Mohs scale and are chemically compatible with the oxides that may form on the surface of the steel wheels and rails. The silica particles with a Mohs hardness of 7 are viewed as optional, not required, filler particles in the mixtures of the subject invention.

Thus, in a more general statement of the invention, it is possible to form other synthetic friction mixtures provided that the mixtures include particles of different hardness properties and particle sizes as specified herein.

With respect to the hard particle constituent, chromium oxide ($Cr_2O_3$) with a Mohs hardness of 8.5; diamond with a Mohs hardness of 10; silicon carbide with a Mohs hardness of 9 and/or titanium carbide with a Mohs hardness of 9 are suitable. Such particles may be used in place of or in combination with $Al_2O_3$. The total content of hard particles is 40% to 96% by weight of the mixture. The particle size is 30 to 100 mesh.

Substitutions may also be made for the paste-forming particles titania and iron oxide. For example, one or more of magnesia (MgO) with a Mohs hardness of 4, calcite (calcium carbonate) with a Mohs hardness of 3, zinc oxide (ZnO) with a Mohs hardness of 4.5, manganese oxide (MnO) with a Mohs hardness of 5.5, gypsum ($CaSO_4 \cdot 2H_2O$) with a Mohs hardness of 2 or hydraulic cement ($Al_2O_3 \cdot SiO_2$) with a Mohs hardness of 4 may be used in place of, or in combination with, titania or iron oxide. As suggested above, hematite or magnetite may be used together or interchangeably. Other paste-forming oxides and minerals are disclosed below. Suitable soft, paste-forming additives constitute 4% to 60% by weight of the subject adhesion mixtures and have particle sizes in the range of 200 to 325 mesh.

As stated above, the mixture of the alumina, titania and iron oxide with or without substitutions (or other hard particles and paste-forming particle mixtures) may be used as a dry powder and applied to the interface between the driving wheel and the rail when improved adhesion is needed. In another form of the invention, however, the powder mixture may be used in the form of a paste using, e.g., water or water mixed with isopropyl alcohol as the vehicle for the paste. Neither water nor isopropyl alcohol are harmful to the environment. Where needed, the isopropyl alcohol provides a shorter evaporation time to the vehicle mixture and a significantly reduced freezing point.

In still another embodiment of the invention, the powder mixture is suitably uniformly embedded in a metal matrix. For example, it may be sintered with wrought or cast, soft iron or aluminum or otherwise suitably embedded in an iron, copper or aluminum matrix. In the metal matrix composite form of the invention, the material is suitably processed in the form of a shoe which at suitable times is caused to ride against the rail ahead of the driving wheel and abrade to form and propel friction particles between the wheel and rail. Alternatively, the shoe may be pressed against the drive wheel above the wheel-rail interface for a like purpose.

Thus, while the invention has been summarized briefly, other objects and advantages will be appreciated from a more detailed description which follows.

DESCRIPTION OF PREFERRED EMBODIMENTS

In accordance with this invention, families of adhesion-promoting materials for use between a locomotive wheel and an underlying supporting surface are disclosed. A preferred family of materials utilize particles that contain aluminum oxide, titanium oxide and iron oxide, either as individual oxide particles or specified varying sizes or as oxide mixtures within particles. Such oxide compositions have been tested both in apparatus on commercial locomotives in real world situations as well as in laboratory tests. In both modes of testing, these particles have been demonstrated to provide improved tractive and braking adhesion (over sand, alumina or mullite) between locomotive wheels and underlying rails in dry conditions, in wet conditions and in oil and other contaminated track conditions.

For test purposes, the tractive effort of a locomotive is the pull force measured on a draw bar that links the locomotive to a test vehicle. This force divided by the measured weight of the locomotive, expressed as a percentage, is recorded as the measured adhesion of the locomotive. Additionally, on a single axle of the locomotive, measurements of the electrical parameters on the motor that powers the wheels is used to calculate the frictional force on an axle (connected to a pair of wheels). The proportion of vertical load coming on a particular axle is determined experimentally by an analysis of weight shift measurements, and the adhesion for that axle is calculated by dividing the frictional force by the vertical load, expressed as a percentage.

Many adhesion tests were run both on an operating locomotive and in laboratory friction testing devices. In general, materials stated herein as suitable for use in the subject invention were found to consistently display higher adhesion than like data for sand alone, pure alumina alone or for the data reported by K. Ohno et al in 1994 with respect to mullite, a mineral consisting of $3Al_2O_3 \cdot 2SiO_2$. The Ohno data reported adhesion ranges from 0.15 to 0.25 for wet conditions, but the adhesion levels for the subject tested alumina/titania/iron oxide and optionally silica formulations were in the range of 0.24 to 0.38 at slow speeds under wet conditions and even higher under dry conditions. Furthermore, the subject formulations demonstrated good adhesion under oily conditions which were not reported in the Ohno article. Thus, in the actual conditions under which locomotives operate, that is, where the tracks may be dry, oily, dirty or wet, the subject compositions consistently provided durable adhesion layers that were better than sand alone or silica or alumina or mullite and offer better traction for start-up and stopping of trains. The following Table 1 summarizes specific oxides and minerals for use in the practice of the subject invention.

nally 85% by weight or more aluminum oxide and a few percent by weight each of titanium oxide, iron oxide and silica. Such materials are relatively inexpensive and may be comminuted to a particle size of about 30 to 100 mesh (150 to 600 micrometers) and in accordance with this invention are found to provide excellent adhesion as dry particles

TABLE 1

Alternative Oxides/Mixtures

| Category | Name | Chemical Formula | Hardness (Mohs) | Size Ranges (Mesh) | Composition Ranges (%) |
|---|---|---|---|---|---|
| High Hardness | Alumina | $Al_2O_3$ | 9 | 30–100 | 40–96 |
| Coarser | Chromium Oxide | $Cr_2O_3$ | 8.5 | | |
| Abrasives | Silicon Carbide | SiC | 9 | | |
| | Diamond | | 10 | | |
| Paste-Forming | Titania | $TiO_2$ | 6 | 200–325 | 4–60 |
| Agents- | Magnesia | MgO | 4 | | |
| Oxides | Zinc Oxide | ZnO | 4.5 | | |
| | Calcium Oxide | CaO | 4.5 | | |
| | Manganese Oxide | MnO | 5.5 | | |
| | Hematite | $Fe_2O_3$ | 6.5 | | |
| | Magnetite | $Fe_3O_4$ | 6 | | |
| Paste-Forming | Orthoclase | $KAlSi_3O_8$ | 6 | | |
| Agents- | Hornblende | Ca,Al,Mg,Fe Silicates | 5–6 | | |
| Minerals | Pyrite | $FeS_2$ | 6–6.5 | | |
| | Chalcopyrite | $CuFeS_2$ | 3.5–4 | | |
| | Sphalerite | ZnS | 3.5–4 | | |
| | Wollastonite | $CaSiO_3$ | 4.5–5 | | |
| | Limonite | $Fe_2O_3.H_2O.$ $Fe_2O_3$ | 5–5.5 | | |
| | Aragonite | $CaCO_3$ | 3.5–4 | | |
| | Feldspar | $(Na,K) AlSi_3O_8$ | 6 | | |
| | Hydraulic cement | $Al_2O_3.SiO_2$ | 4 | | |
| | Gypsum | $CaSO_4 \cdot 2H_2O$ | 2 | | |
| Intermediate | Silica | $SiO_2$ | 7 | 100–200 | 0–20 |
| Hardness | Zirconia | $ZrO_2$ | 7 | | |
| Fillers | | | | | |
| Mixtures of | Brown Alumina | | | 30–100 | |
| Above- | Calcined Bauxite | | | 30–100 | |
| Processed | | | | | |
| Minerals | | | | | |

Conversion Table - Mesh to Micrometers

| Mesh | Microns ($\mu m$) |
|---|---|
| 30 | 600 |
| 100 | 150 |
| 200 | 75 |
| 325 | 45 |

Adhesion-Enhancing Material Mixtures of Bauxite Origin

The term bauxite is applied generally to rocks that contain significant quantities of aluminum hydroxide precursor material. It is a primary ore for aluminum production. Bauxite exists in a great many varieties of compositions and is found in virtually every continent on Earth. Bauxites contain varying amounts of aluminum oxide, silica and iron oxides, as well as small amounts of other materials such as titanium oxide. In the processing of bauxite such as by the Bayer process to form aluminum hydroxide, various commercial products are available other than those that are used in the production of aluminum oxide or aluminum.

Among such materials that are useful as friction promoters for locomotives are materials variously known as calcined bauxite or brown alumina and which contain nominally 85% by weight or more aluminum oxide and a few percent by weight each of titanium oxide, iron oxide and silica. Such materials are relatively inexpensive and may be comminuted to a particle size of about 30 to 100 mesh (150 to 600 micrometers) and in accordance with this invention are found to provide excellent adhesion as dry particles when applied beneath the wheels of a locomotive and the supporting rail. Also, such bauxite-derived materials which contain predominantly aluminum oxide with small amounts of iron oxide and titanium oxide may be used in the form of a water or water isopropanol paste or in the form of a composite material in which they are embedded in a soft metal matrix. In each of these embodiments, the bauxite-derived material is applied to the surface of the rail and adheres tenaciously to it to provide improved starting or braking traction with the wheels of a locomotive or train car.

In a particularly preferred embodiment, additional bauxite-derived material may be pulverized to a finer grain size such as 250 to 325 mesh and mixed with the larger grained bauxite-derived material to provide a more adherent layer on the rail.

Synthetic Particle Mixtures for Friction Improvement

As indicated in the above text and in Table 1, mixtures of suitable oxides and minerals may also be prepared for use as adhesion promoters.

A principal constituent of the mixture is hard oxide or carbide particles having a Mohs hardness value in the range of 8.5 to 10 and having a particle size of 150 to 600 micrometers. It is preferred but not necessary that alumina particles, either alpha alumina or gamma alumina particles, be the principal ingredient of this constituent. In a preferred embodiment, the high hardness abrasive material may consist entirely of alumina or it may contain mixtures of alumina and chromium oxide, silicon carbide, diamond or the like. It is preferred that the high hardness abrasive material constitute 40% to 96% by weight of the adhesive mixture. It is further preferred that the abrasive particles be the largest particles in the mixture, having a size range of 30 to 100 mesh or 150 to 600 micrometers.

Critical to the function of the adhesive mixture is the presence of a paste-forming constituent. The paste-forming constituent constitutes 4% to 60% by weight of the overall adhesive composition. These particles are softer than the high hardness abrasive particles. These paste-forming agents, whether metal oxides or other minerals of comparable hardness, suitably have a hardness in the range of 3.5 to about 6.5 on the Mohs hardness scale. As disclosed in Table 1, a number of other oxides and minerals will serve the purpose of the paste-forming agent. However, it is preferred that titania and iron oxides be present and constitute a major portion of this ingredient. The paste-forming agents are of smaller particle size so that they tend to fit between the larger abrasive particles. The paste-forming agents suitably are of a size range of 200 to 325 mesh, 45 to 75 micrometers in particle diameter.

In some formulations, it is found that intermediate hardness fillers add to the adhesive properties of the mixture. Examples of suitable intermediate hardness fillers are silica and zirconia. They have hardness values of the order of 6.5 to 8 on the Mohs hardness scale. Their particle size may be slightly larger than the paste-forming agents but smaller than the coarser abrasive particles. A suitable range for the particle sizes of the intermediate filler materials is 100 to 200 mesh or about 75 to 150 micrometers. When these materials are used, they may be used in amounts up to about 20% by weight of the overall formulation.

Following are examples of three synthetic mixtures of alumina, titania, iron oxide and silica that have demonstrated excellent coefficient of friction values under a variety of wet and dry test conditions.

| Test Condition | Oxide Mixture Compositions (%) | | | | |
|---|---|---|---|---|---|
| | Alumina | Silica | Iron Oxide | Titania | Friction |
| Dry | 80 | 4 | 15 | 1 | 0.54 |
| Dry | 80 | 3 | 2 | 15 | 0.52 |
| Wet | 94 | 2 | 2 | 2 | 0.53 |

The above bauxite-derived materials or synthetic mixtures of varying hardness and particle size can be employed in dry powder form and dispersed on the rails in front of the drive wheels of a locomotive using substantially the same or like equipment as is employed in the distribution of sand particles on the rails. However, the mixtures of this invention are found to more readily form an adherent layer that clings to the track and provides additional tractive or braking adhesion properties.

While the mixtures may be used in dry form, it is also useful to apply them in the form of a paste. In this case, the dry materials are simply mixed with sufficient water or water-isopropanol solutions or the like mixtures so that they can be extruded in paste form onto the rail ahead of the drive wheel. In these wet forms, they readily form a tractive film that remains adherent even after drying. In this way, the subject adhesion-providing materials remain on the track and provide adhesion improvement for several following drive wheels of the trailing locomotives.

It is also suitable to disperse the subject bauxite-derived materials and synthetic materials in a metallic matrix of a soft metal. This can be done by pouring the molten metal into a form that contains the particulate mixture so that the molten metal infiltrates around the particles and upon solidification forms a suitable shoe for rubbing against a locomotive wheel to distribute the adhesions-promoting particles onto the track. In another embodiment, the powder can be mixed with wrought iron or cast soft iron or aluminum particles to form a sintered shoe.

While the invention has been described in terms of a few specific embodiments, it will be appreciated that other forms could readily be adapted by those skilled in the art. Accordingly, the scope of the invention is to be limited only by the following claims.

We claim:

1. A method of increasing friction between a locomotive wheel and an underlying rail comprising applying between the wheel and rail a powder comprising at least one of (a) a mixture of aluminum oxide, titanium oxide and iron oxide having particles in the 45 to 600 micrometer size range or (b) a mixture comprising 40% to 96% by weight of particles of one or more first materials selected from the group consisting of aluminum oxide, chromium oxide, silicon carbide and diamond said first material having a Mohs hardness of 8.5 or higher and a particle size of 150 to 600 micrometers and 4% to 60% by weight of particles of one or more second materials selected from the group consisting of titania, magnesia, zinc oxide, calcium oxide, manganese oxide, hematite and magnetite, said second material having a Mohs hardness in the range of 3.5 to 6 and having a particle size in range of about 45 to 75 micrometers.

2. A method of increasing friction between a locomotive wheel and an underlying rail comprising applying between the wheel and rail a particulate mixture comprising 40% to 96% by weight of particles having a Mohs hardness of 8.5 or higher, a particle size of 150 to 600 micrometers and including alumina particles as a principle constituent and 4% to 60% by weight of particles having a Mohs hardness in the range of 3.5 to 6, having a particle size in range of about 45 to 75 micrometers and containing titanium oxide and/or iron oxide.

3. A method of increasing friction between a locomotive wheel and an underlying rail comprising applying between the wheel and rail a powder mixture consisting essentially of bauxite-derived particles having a grain size in the range of about 45 to 600 micrometers and comprising at least 80% by weight aluminum oxide, titania and iron oxide.

4. A method as recited in claim 3 in which the powder mixture applied also contains silica and/or zirconia.

5. A method as recited in any of claims 1 through 3 in which the powder mixture is applied to said interface in the form of a liquid-containing paste.

6. A method as recited in any of claims 1 through 3 in which the powder mixture is applied between the wheel and rail by abrading a metal matrix composite of the powder mixture in a soft metal matrix against the wheel or the rail to abrade particles of said powder mixture from said composite onto said rail.

7. A friction enhancing powder mixture for application between a locomotive wheel and an underlying supporting surface, said mixture comprising 40% to 96% by weight of particles comprising one or more first materials selected from the group consisting of aluminum oxide, chromium oxide, silicon carbide and diamond, said first material having a Mohs hardness of 8.5 or above; a particle size in the range of 150 to 600 microns, and 4% to 60% by weight of particles comprising one or more second materials selected from the group consisting of titania, magnesia, zinc oxide, calcium oxide, manganese oxide, hematite and magnetite, said second material having a Mohs hardness in the range of 3.5 to 6.5, and a particle size in the range of about 45 to 75 micrometers.

* * * * *